Patented Jan. 7, 1936

2,027,126

UNITED STATES PATENT OFFICE 2,027,126

ANÆSTHETIC

Oscar H. Stover and Edmund H. Brigham, Buffalo, N. Y., assignors to The Oleothesin Company, Inc., Buffalo, N. Y.

No Drawing. Application October 27, 1933,
Serial No. 695,509

4 Claims. (Cl. 167—52)

This invention relates to improvements in local anæsthetics which may be applied either topically or by injection.

The objects of this invention are to provide an anæsthetic of this kind in which procaine base is combined with certain fatty acids to produce an anæsthetic having certain new and desirable properties; also to provide an anæsthetic of this kind in which a high percentage of procaine base can be incorporated; also to produce an anæsthetic of this kind in which the salt produced by the reaction of procaine base and a fatty acid constitutes a solvent for additional procaine base; also to provide an anæsthetic which may be dissolved in mineral oils, as well as in animal and vegetable oils; also to improve anæsthetics of this type in other respects hereinafter specified.

In the production of this anæsthetic, the procaine base may be derived from any suitable source. For example, procaine base may be made by acting on a procaine hydrochloride solution in water with an alkali which reacts with the HCl radical of the procaine hydrochloride and reduces the hydrochloride to the base. This base is not soluble in water, and will, consequently, be precipitated in the reaction vessel, and may be removed from the water in any suitable manner. For example, this precipitate may be dissolved in ether, chloroform, or other solvent not miscible with water, while the precipitate is in the aqueous solution, and the ether or chloroform may then be allowed to separate from the water solution, and can be drawn from the water solution into an evaporating vessel. Upon evaporation of the ether or chloroform, pure crystals of procaine base will remain in the vessel. Any other means for producing procaine base may be employed if desired.

It is known that procaine base is very desirable for use as an anæsthetic, but the use of procaine base has been limited for the reason that it is not soluble in water and consequently procaine hydrochloride is generally used since water solutions thereof can readily be injected into the system. Procaine base, however, has some advantages over procaine hydrochloride, particularly in that it is less toxic, and furthermore procaine hydrochloride solution is not effective as a topical anæsthetic, whereas procaine base can be readily used in this manner if in concentrated solution.

In accordance with this invention, procaine base, which is of an alkaline nature, is combined with certain fatty acids, thus producing a salt or soap. This resulting product is readily soluble in water as well as in animal, vegetable and mineral oils, and furthermore, this resulting product is much less objectionable for use as a topical anæsthetic in certain types of cases, in that the resulting salt has no objectionable taste and is not irritating to mucous membranes or to the skin. The resulting salt also has the advantage that it has a very low surface tension and an anæsthetic of low surface tension more readily produces anæsthetic than an equivalent anæsthetic of greater surface tension. Furthermore, the new anæsthetic when used to produce anæsthesia in the mouth will mix better with saliva than any other anæsthetics heretofore produced, resulting in a better penetration of the anæsthetic into the mucous membranes of the mouth.

Our anæsthetic can be produced by reaction of procaine base with any fatty acid, saturated or unsaturated but certain fatty acids are, of course, unsuitable for use in connection with the producing of anæsthesia, some fatty acids being, for example, more or less poisonous. The best anæsthetics of this kind are produced by selecting fatty acids containing at least nine carbon atoms. The fatty acid or acids to be used may be selected for the purpose of determining the melting point of the final product or for the solubility of the final product in animal, vegetable, or mineral oils.

In the preparation of this improved anæsthetic, equal molecular parts by weight of procaine base and the desired fatty acid are intimately mixed. Preferably, the ingredients are slightly warmed and are stirred for about three minutes to assist in the reaction between the ingredients. The resulting product will then be a compound free from an excess of procaine base or fatty acid. If, however, it is desired to provide an excess of procaine base in the product, additional procaine base may be added after the salt has been formed, since procaine base is soluble in the salt thus formed. Increased anæsthetic action, of course, results if an excess of procaine base is used.

The resulting fatty acid salts of procaine base will probably have the following structural formula:

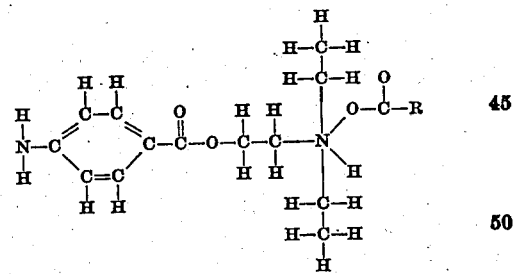

In the above formula R varies, depending upon the nature of the fatty acid which is used, and by way of example, R may be any one of the following: $(CH_2)_7CH_3$; $(CH_2)_8CH_3$; $(CH_2)_9CH_3$; $(CH_2)_{10}CH_3$; $(CH_2)_{12}CH_3$; $(CH_2)_{14}CH_3$; $(CH_2)_{16}CH_3$; $CH_3 \cdot (CH_2)_7 \cdot C = CH(CH_2)_7$; or $CH_3 \cdot (CH_2)_7 \cdot HC = CH(CH_2)_{11}$; depending upon whether the fatty acid used is pelargonic, capric, undecylic, lauric, myristic, palmitic, stearic, oleic, or erucic respectively. Other fatty acids than those mentioned can, of course, be used and the formula would then vary accordingly.

The oil solution of the fatty acid salt of procaine base may be prepared by warming and stirring together the salt and oil to be used as a solvent. Different proportions of solvent oil and procaine salt may be used to produce products which vary in viscosity when liquid, or which vary in consistency when solid. A satisfactory anæsthetic has, for example, been prepared by stirring together equal weights of procaine salt and oil, but more or less oil may be used as desired. The mineral oil solution of this improved anæsthetic is particularly desirable for use in certain cases where patients are allergic to animal and vegetable oils, and furthermore, the mineral oil solution has the advantage that it does not become rancid.

We claim as our invention:

1. An anæsthetic including a salt formed by the reaction of procaine base and a fatty acid having at least nine carbon atoms.

2. An anæsthetic including substantially equimolecular parts of procaine base and a fatty acid having at least nine carbon atoms combined to form a salt.

3. An anæsthetic including a salt of a fatty acid having at least nine carbon atoms and procaine base, and dissolved in oil.

4. In an anæsthetic, a mineral oil solution of a salt of a fatty acid having at least nine carbon atoms and procaine base.

OSCAR H. STOVER.
EDMUND H. BRIGHAM.